US010883385B2

(12) United States Patent
Strait et al.

(10) Patent No.: US 10,883,385 B2
(45) Date of Patent: Jan. 5, 2021

(54) THERMAL BARRIER WASHER

(71) Applicant: UNITED TECHNOLOGIES CORPORATION, Farmington, CT (US)

(72) Inventors: Mathieu Strait, Rocky Hill, CT (US); Mainul M. Islam, Bolton, CT (US)

(73) Assignee: Raytheon Technologies Corporation, Farmington, CT (US)

(*) Notice: Subject to any disclaimer, the term of this patent is extended or adjusted under 35 U.S.C. 154(b) by 801 days.

(21) Appl. No.: 15/249,589

(22) Filed: Aug. 29, 2016

(65) Prior Publication Data

US 2018/0058475 A1    Mar. 1, 2018

(51) Int. Cl.
*F01D 25/28* (2006.01)
*F16B 39/10* (2006.01)
(Continued)

(52) U.S. Cl.
CPC ........... *F01D 25/28* (2013.01); *F01D 25/145* (2013.01); *F01D 25/243* (2013.01); *F02C 3/04* (2013.01); *F02C 7/047* (2013.01); *F02C 7/24* (2013.01); *F02C 7/32* (2013.01); *F02K 3/06* (2013.01); *F04D 27/009* (2013.01); *F04D 29/522* (2013.01); *F04D 29/5853* (2013.01); *F04D 29/644* (2013.01); *F16B 39/101* (2013.01); *F16L 59/12* (2013.01); *F05D 2220/323* (2013.01); *F05D 2240/35* (2013.01); (Continued)

(58) Field of Classification Search
CPC .... F01D 11/005; F01D 25/145; F01D 25/243; F01D 25/28; F04D 29/5853; F04D 29/083; F04D 29/522; F04D 29/644; F02C 7/047; F02C 7/24; F02C 7/32; F16B 39/24; F16B 43/001; F16J 15/122; F16L 59/12
See application file for complete search history.

(56) References Cited

U.S. PATENT DOCUMENTS 1,008,084 A * 11/1911 Smith .................. F16B 39/101
411/98
2,055,471 A    9/1936 Balfe
(Continued)

FOREIGN PATENT DOCUMENTS

CN    201843888 U    5/2011
EP        2474712 A2 * 7/2012 ............. F01D 25/28
(Continued)

OTHER PUBLICATIONS

EPO Machine Transltion o f JP-361119878-A Jun. 1986.*
European Search Report for European Application No. 17187451.4 dated Jan. 3, 2018.

*Primary Examiner* — Ninh H. Nguyen
*Assistant Examiner* — Brian Christopher Delrue
(74) *Attorney, Agent, or Firm* — Carlson, Gaskey & Olds, P.C.

(57) ABSTRACT

An attachment mechanism for a gas turbine engine component includes an elongated body having at least first and second ends. A first attachment feature is formed at the first end. A second attachment feature is formed at the second end. The first and second attachment features define attachment points configured to attach a first gas turbine engine component to a second gas turbine engine component. A fan section for a gas turbine engine and a gas turbine engine are also disclosed.

20 Claims, 4 Drawing Sheets

(51) Int. Cl.

| | | |
|---|---|---|
| *F02C 7/32* | (2006.01) | |
| *F01D 25/14* | (2006.01) | |
| *F16L 59/12* | (2006.01) | |
| *F02C 7/047* | (2006.01) | |
| *F01D 25/24* | (2006.01) | |
| *F02C 7/24* | (2006.01) | |
| *F02C 3/04* | (2006.01) | |
| *F02K 3/06* | (2006.01) | |
| *F04D 27/00* | (2006.01) | |
| *F04D 29/52* | (2006.01) | |
| *F04D 29/58* | (2006.01) | |
| *F04D 29/64* | (2006.01) | |
| *F16B 39/24* | (2006.01) | |
| *F16B 43/00* | (2006.01) | |

(52) U.S. Cl.
CPC .. *F05D 2300/121* (2013.01); *F05D 2300/603* (2013.01); *F16B 39/24* (2013.01); *F16B 43/004* (2013.01); *Y02T 50/60* (2013.01)

(56) References Cited

U.S. PATENT DOCUMENTS

| | | | |
|---|---|---|---|
| 3,939,892 A | 2/1976 | Farnam et al. | |
| 3,941,640 A | 3/1976 | Farnam et al. | |
| 5,343,663 A | 9/1994 | Larrea et al. | |
| 5,393,108 A | 2/1995 | Kerr | |
| 5,934,687 A * | 8/1999 | Bagepalli | F01D 11/005 277/637 |
| 6,875,464 B2 | 4/2005 | Ruud et al. | |
| 7,797,936 B2 * | 9/2010 | Hayashi | F01D 25/16 411/395 |
| 7,900,438 B2 * | 3/2011 | Venkataramani | F01D 9/065 244/134 B |
| 8,740,558 B2 | 6/2014 | Robertson, Jr. et al. | |
| 8,777,562 B2 | 7/2014 | Strock et al. | |
| 9,114,882 B2 | 8/2015 | Robertson, Jr. et al. | |
| 9,181,877 B2 | 11/2015 | Travis et al. | |
| 2008/0053100 A1 * | 3/2008 | Venkataramani | F02C 7/047 60/772 |
| 2009/0130424 A1 | 5/2009 | Tholen et al. | |
| 2011/0138769 A1 | 6/2011 | Costa et al. | |
| 2013/0108420 A1 * | 5/2013 | Morgan | F16J 15/122 415/182.1 |
| 2016/0010503 A1 | 1/2016 | Robertson, Jr. et al. | |
| 2016/0017753 A1 | 1/2016 | Robertson et al. | |
| 2016/0207632 A1 | 7/2016 | Rios | |

FOREIGN PATENT DOCUMENTS

| | | | |
|---|---|---|---|
| EP | 2474712 A2 | 7/2012 | |
| JP | 61119878 A * | 6/1986 | ............. F02B 77/11 |
| JP | S61119878 A | 6/1986 | |

* cited by examiner

THERMAL BARRIER WASHER

BACKGROUND OF THE INVENTION

A gas turbine engine includes a fan section that drives air along a bypass flow path via a bypass duct defined within a nacelle, while a compressor section drives air along a core flow path for compression and communication into a combustor section and subsequent expansion through a turbine section. The fan section comprises a fan case that surrounds a fan. The fan case can serve as an attachment point to mount other components within the gas turbine engine. For example, hot components such as a hot duct can be mounted to the fan case via a link and bracket assembly. Traditionally, the bracket for the link has been directly mounted to a fan case boss. This direct mount configuration provides a heat transfer path from the hot duct to the fan case.

However, due to temperature restrictions for the fan case, components that are to be mounted to the fan case are subject to a touch temperature requirement. As such, it is important to minimize heat transfer from hot components to the fan case via respective attachment points.

SUMMARY OF THE INVENTION

In a featured embodiment, an attachment mechanism for a gas turbine engine component includes an elongated body having at least first and second ends. A first attachment feature is formed at the first end. A second attachment feature is formed at the second end. The first and second attachment features define attachment points configured to attach a first gas turbine engine component to a second gas turbine engine component.

In another embodiment according to the previous embodiment, the elongated body is comprised of a rigid metallic material.

In another embodiment according to any of the previous embodiments, the rigid metallic material comprises aluminum.

In another embodiment according to any of the previous embodiments, the first and second attachment features comprise first and second washers that are integrally formed with the elongated body as a single-piece structure.

In another embodiment according to any of the previous embodiments, each washer comprises a ring-shaped body.

In another embodiment according to any of the previous embodiments, the ring-shaped body includes a split.

In another embodiment according to any of the previous embodiments, the split separates the ring-shaped body into first and second curved portions with respective first and second upper surfaces, and wherein the first and second upper surfaces are non-coplanar when the washers are in an uninstalled configuration.

In another embodiment according to any of the previous embodiments, the first and second washers comprise split lock washers.

In another embodiment according to any of the previous embodiments, the first and second washers each include a center opening, and including a first fastener extending through the center opening of the first washer and a second fastener extending through the center opening of the second washer, wherein the first and second fasteners fix the first gas turbine engine component to the second gas turbine engine component.

In another embodiment according to any of the previous embodiments, the first gas turbine engine component comprises a hot duct structure and the second gas turbine engine component comprises a fan case.

In another embodiment according to any of the previous embodiments, a thermal isolation barrier surrounds the elongated body and the first and second washers.

In another featured embodiment, a fan section for a gas turbine engine has a fan case configured to surround a fan, which includes at least one mount interface. A component is configured to be attached to the mount interface. An attachment mechanism attaches the component to the fan via the mount interface. The attachment mechanism comprises an elongated body having at least first and second ends. A first attachment feature is formed at the first end, and a second attachment feature is formed at the second end. The first and second attachment features are integrally formed with the elongated body as a single-piece structure.

In another embodiment according to the previous embodiment, the first and second attachment features comprise first and second washers.

In another embodiment according to any of the previous embodiments, the first and second washers comprise split lock washers.

In another embodiment according to any of the previous embodiments, the mount interface comprises a fan case boss that extends outwardly from an external surface of the fan case, and wherein the attachment mechanism is configured to attach the component to the fan case boss via a bracket.

In another embodiment according to any of the previous embodiments, a thermal isolation barrier surrounds the elongated body and the first and second washers such that the bracket directly contacts the thermal isolation barrier on one side of the attachment mechanism and the fan case boss directly contacts the thermal isolation barrier on an opposite side of the attachment mechanism.

In another embodiment according to any of the previous embodiments, the first and second washers each include a center opening, and including a first fastener extending through the center opening of the first washer and a second fastener extending through the center opening of the second washer, wherein the first and second fasteners fix the component to the fan case boss.

In another embodiment according to any of the previous embodiments, the fan case is comprised of a composite material, and wherein the elongated body is comprised of a rigid metallic material.

In another featured embodiment, a gas turbine engine has a fan section that drives air along a bypass flow path via a bypass duct defined within a fan case. A compressor section drives air along a core flow path for compression and communication into a combustor section and subsequent expansion through a turbine section. A component is attached to the fan case via an attachment mechanism that comprises an elongated body having at least first and second ends. A first washer is formed at the first end, and a second washer is formed at the second end. The first and second washers are integrally formed with the elongated body as a single-piece structure.

In another embodiment according to the previous embodiment, the fan case includes a fan case boss. The attachment assembly is configured to attach the component to the fan case boss via a bracket, and includes a thermal isolation barrier that surrounds the elongated body and the first and second washers such that the bracket directly contacts the thermal isolation barrier on one side of the attachment mechanism and the fan case boss directly contacts the thermal isolation barrier on an opposite side of the attachment mechanism. A first fastener extends through a center opening of the first washer. A second fastener extends through a center opening of the second washer. The first and second fasteners fix the component to the fan case boss.

The foregoing features and elements may be combined in any combination without exclusivity, unless expressly indicated otherwise.

These and other features may be best understood from the following drawings and specification.

DETAILED DESCRIPTION

Figure 1:
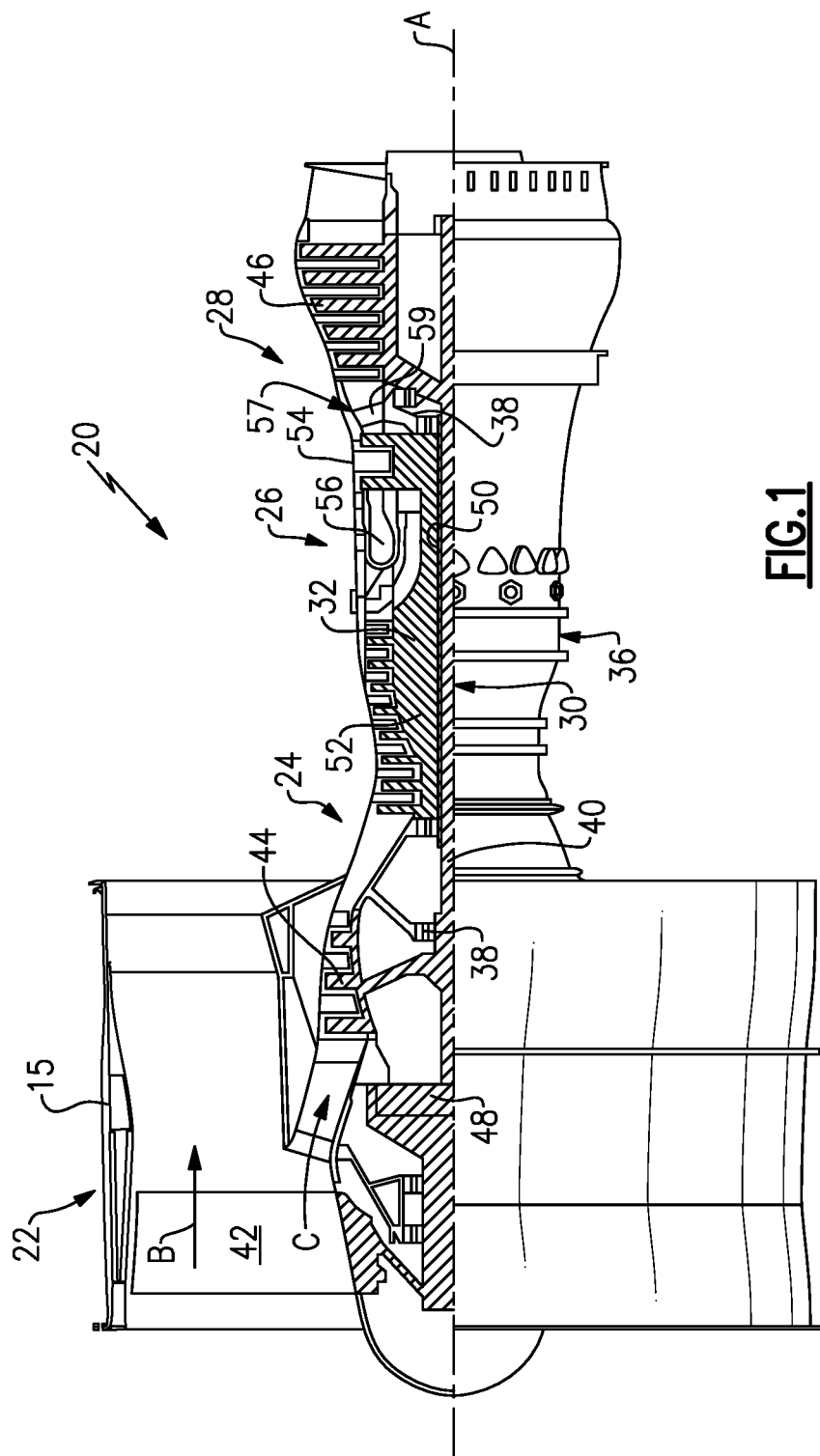
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
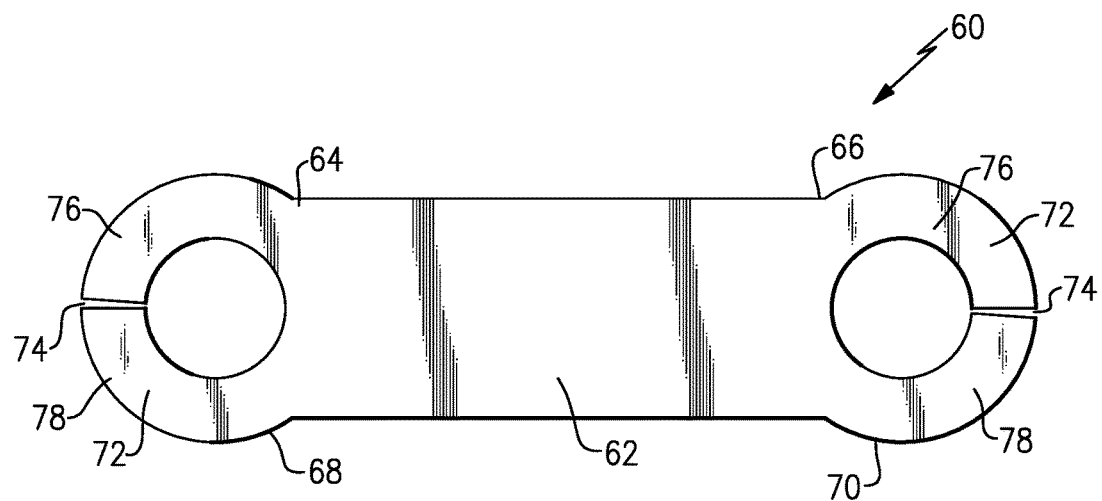
FIG. 2 is a top view of an attachment mechanism incorporating the subject invention.
Figure 3:
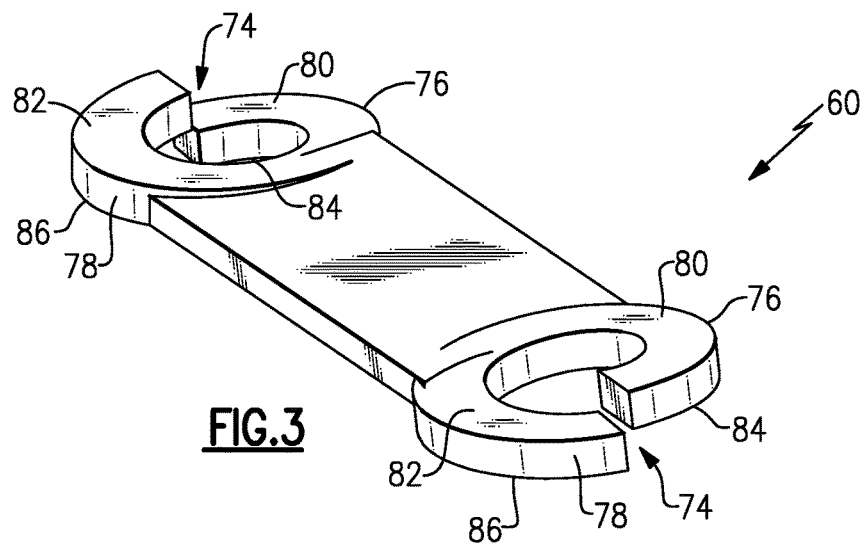
FIG. 3 is a perspective view of the mechanism of FIG. 2.

FIGS. 2-3 show an attachment mechanism 60 comprising a thermal barrier seal that is used to connect a first engine component to another component. In one example, the attachment mechanism 60 is used to connect an engine component to the fan case or fan nacelle 15 of the fan section 22 (FIG. 1). The attachment mechanism 60 includes a spine comprising an elongated body 62 having at least first 64 and second 66 ends. A first attachment feature 68 is formed at the first end 64 and a second attachment feature 70 is formed at the second end 66. The first 68 and second 70 attachment features define attachment points that are used to attach the two engine components together. This will be discussed in greater detail below.

In one example, the elongated body 62 comprises a straight, flat bar or spine body that has the first 68 and second 70 attachment features formed on opposing ends. In one example, the elongated body 62 is comprised of a rigid metallic material. One type of material that could be used for the body 62 is aluminum, for example.

As shown in FIGS. 2-3, the first 68 and second 70 attachment features comprise first and second washers that are integrally formed with the elongated body 62 as a single-piece structure. Each washer comprises a ring-shaped body 72. In one example, the ring-shaped body 72 includes a split 74 such that the washers comprise split lock washers. The split 74 separates the ring-shaped body 72 into first 76 and second 78 curved portions. The first 76 and second 78 curved portions have respective first 80 and second 82 upper surfaces and first 84 and second 86 lower surfaces that face opposite from the upper surfaces 80, 82. As shown in FIG. 3, when the washers are in an uninstalled configuration, the first 80 and second 82 upper surfaces are non-coplanar. The first 84 and second 86 lower surfaces are also non-coplanar when in the uninstalled position.

Figure 4:
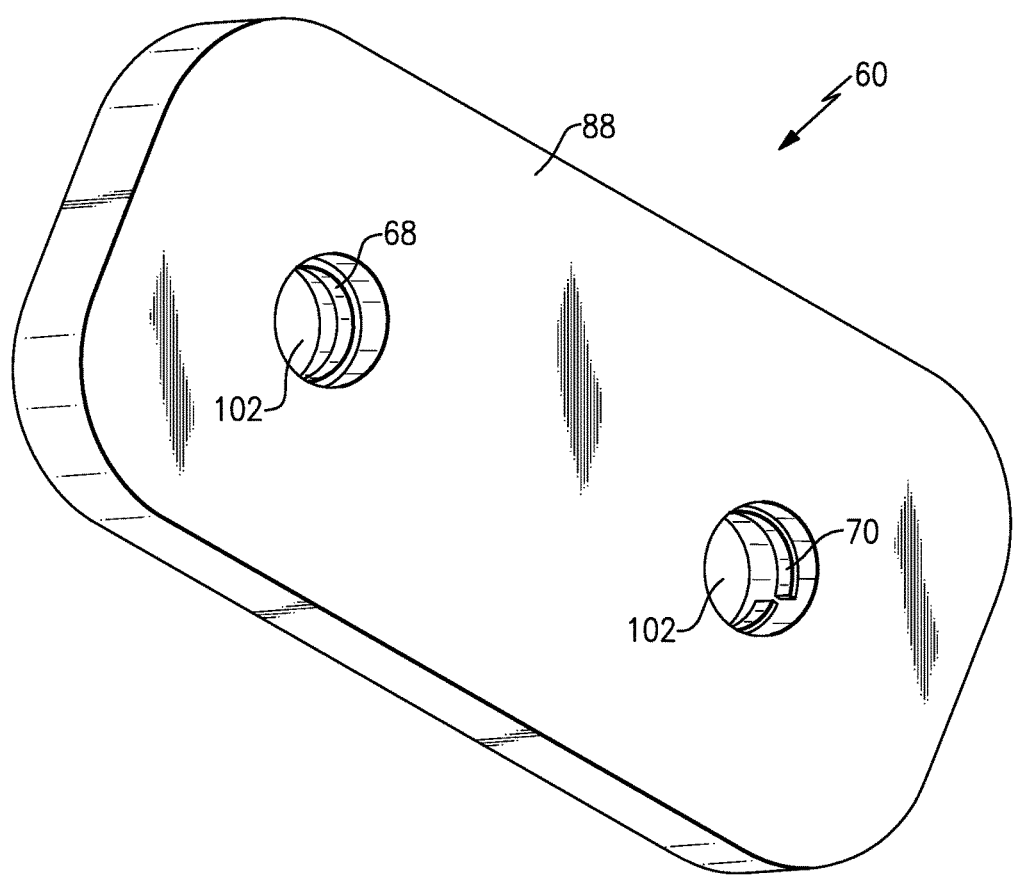
FIG. 4 is a perspective of the mechanism of FIG. 2 with a thermal isolation barrier.
Figure 5:
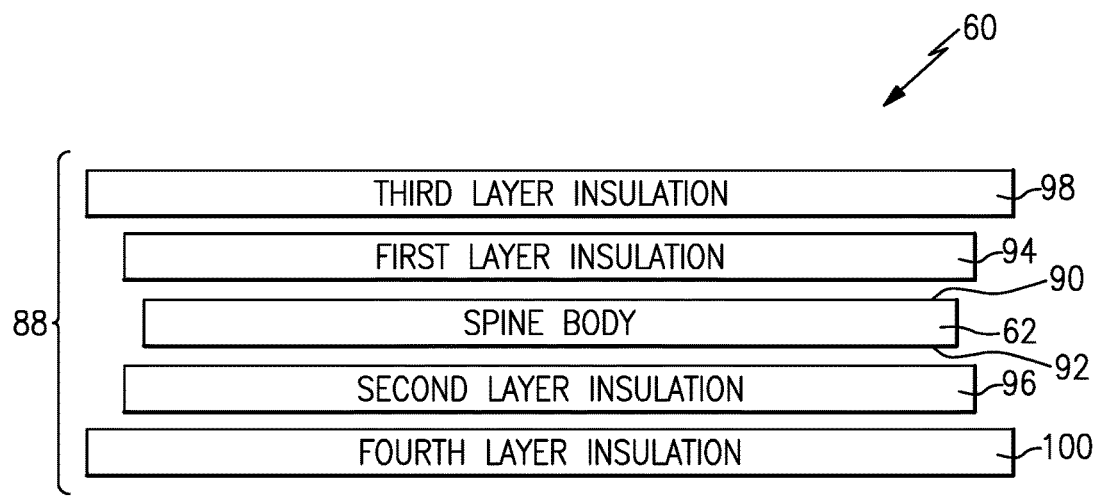
FIG. 5 is a schematic exploded side view of material stack up of the mechanism and thermal isolation barrier of FIG. 4.

As shown in FIG. 4, a thermal isolation barrier 88 surrounds the elongated body 62 and the first 68 and second 70 attachment features. The material used to form the thermal isolation barrier 88 is shown in FIG. 5. The elongated body 62 has an upper surface 90 and a lower surface 92. The thermal isolation barrier 88 comprises a first layer of insulation 94 in direct contact with the upper surface 90 and a second layer of insulation 96 in direct contact with the lower surface 92. A third layer of insulation material 98 is in direct contact with the first layer of insulation 94 and a fourth layer of insulation material 100 is in direct contact with the second layer of insulation 96.

In one example, the first 94 and second 96 layers of insulation material comprise MIN-K® microporous insulation. MIN-K® provides good thermal management performance in combination with having a low weight. The Min-K® material used for the first layer of insulation 94 and second layer of insulation 96 is flexible and can be made from board, tape, felt, or quilt material. The Min-K® material has low thermal conductivity, provides compression resistance and is lightweight.

In one example, the third 98 and fourth 100 layers of insulation material comprise a silicone impregnated cloth. The cloth is wrapped around the stack up of the layers of insulation material 94, 96 and the elongated body 62 with the first 68 and second 70 attachment features. This wrapped structure thus encloses the elongated body 62 and the first 68 and second 70 attachment features to form a sealed structure that includes center openings 102 that extend through each washer of the first 68 and second 70 attachment features.

In one example, the MIN-K® insulation material of the first 94 and second 96 layers is two times a thickness of the silicone impregnated cloth used for the third 98 and fourth 100 layers, and the elongated spine body 62 is one and a half times the thickness of the silicone impregnated cloth. The silicone impregnated cloth wraps around the stack of MIN-K® insulation layers and the elongated spine, and will stiffen as the cloth sets.

Figure 6:
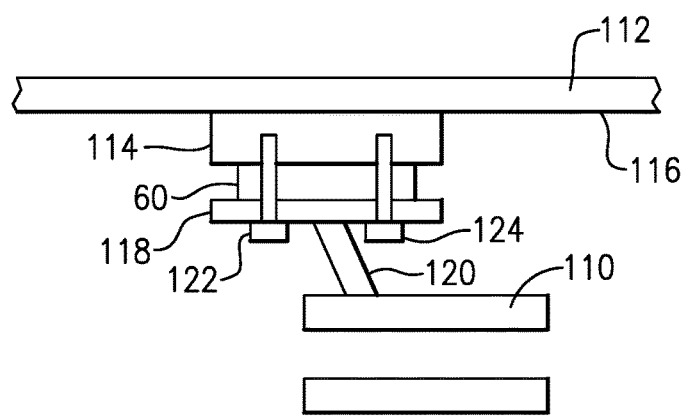
FIG. 6 is a schematic side view of the subject attachment mechanism attaching a component to a fan case.

FIG. 6 shows an example of the attachment mechanism 60 being used to attach an engine component 110 to a fan case 112. The fan case 112 surrounds the fan 42 (FIG. 1) and includes at least one mount interface 114. The engine component 110 is configured to be attached to the mount interface 114 via the attachment mechanism 60. In one example, the mount interface 114 comprises a fan case boss 114 that extends outwardly from an external surface 116 of the fan case 112 and the engine component 110 comprises a hot duct that is secured to the fan case boss via a bracket 118 and linkage 120.

The thermal barrier seal attachment mechanism 60 with the thermal isolation barrier 88 is sandwiched between the bracket 118 and the mount interface 114. As discussed above, the first and second washers that comprise the first 68 and second 70 attachment features have a center opening 102. A first fastener 122 extends through the center opening 102 of the first washer and a second fastener 124 extends through the center opening 102 of the second washer. The first 122 and second 124 fasteners compress against the lock washers such that the lock washers exert a force on the head of the fasteners via compression to prevent the fasteners from backing out.

In one example, the fan case 112 is comprised of a composite material. The composite fan case 112 and fan case boss of the mount interface 114 are subject to temperature restrictions such that components 110 that anchor to the fan case boss are required to meet touch temperature restrictions. The subject attachment mechanism 60 provides a thermal isolation barrier 88 to prevent heat from hot engine components from being transferred to the fan case 112 via attachment points. As discussed above, the thermal isolation barrier 88 is comprised of MIN-K® insulation material wrapped with an impregnated silicone cloth. For added rigidity at the attachment points, the attachment mechanism 60 includes an elongated spine body 62 with integrated lock washers such that the fasteners 122, 124 pass through the attachment mechanism 60 and the thermal isolation barrier 88 to make sure the torque on the thermal barrier washer remains constant over time.

Although embodiments of this invention has been disclosed, a worker of ordinary skill in this art would recognize that certain modifications would come within the scope of this invention. For that reason, the following claims should be studied to determine the true scope and content of this invention.

The invention claimed is:

1. An attachment mechanism for a gas turbine engine component comprising:
   an elongated body having at least first and second ends, wherein the elongated body comprises a rigid, straight and flat bar that extends between the first and second ends and two straight parallel sides connecting the first and second ends;
   a first attachment feature formed at the first end; and
   a second attachment feature formed at the second end, wherein the elongated body is solid between the first and second attachment features and the two straight parallel sides, and wherein the first and second attachment features define attachment points configured to attach a first gas turbine engine component to a second gas turbine engine component.

2. The attachment mechanism according to claim 1, wherein the elongated body is comprised of a rigid metallic material.

3. The attachment mechanism according to claim 2, wherein the rigid metallic material comprises aluminum.

4. The attachment mechanism according to claim 1, wherein the first and second attachment features comprise first and second washers that are integrally formed with the elongated body as a single-piece structure.

5. The attachment mechanism according to claim 4, wherein each washer comprises a ring-shaped body.

6. The attachment mechanism according to claim 5, wherein the ring-shaped body includes a split.

7. The attachment mechanism according to claim 6, wherein the split separates the ring-shaped body into first and second curved portions with respective first and second upper surfaces, and wherein the first and second upper surfaces are non-coplanar when the washers are in an uninstalled configuration.

8. The attachment mechanism according to claim 4, wherein the first and second washers comprise split lock washers.

9. The attachment mechanism according to claim 4, wherein the first and second washers each include a center opening, and including a first fastener extending through the center opening of the first washer and a second fastener extending through the center opening of the second washer, wherein the first and second fasteners are configured to fix the first gas turbine engine component to the second gas turbine engine component.

10. The attachment mechanism according to claim 9, wherein the first gas turbine engine component comprises a hot duct structure and the second gas turbine engine component comprises a fan case.

11. The attachment mechanism according to claim 4 including a thermal isolation barrier that surrounds the elongated body and the first and second washers.

12. A fan section for a gas turbine engine comprising:
a fan case configured to surround a fan, wherein the fan case includes at least one mount interface;
a component configured to be attached to the mount interface; and
an attachment mechanism to attach the component to the fan via the mount interface, the attachment mechanism comprising an elongated body having at least first and second ends and two straight parallel sides connecting the first and second ends, a first attachment feature formed at the first end, and a second attachment feature formed at the second end, wherein the elongated body comprises a rigid, straight and flat bar that is solid between the first and second attachment features and the two straight parallel sides, and wherein the first and second attachment features comprise ring-shaped bodies that are integrally formed with the elongated body as a single-piece structure.

13. The fan section according to claim 12, wherein the first and second attachment features comprise first and second washers.

14. The fan section according to claim 13, wherein the first and second washers comprise split lock washers.

15. The fan section according to claim 13, wherein the mount interface comprises a fan case boss that extends outwardly from an external surface of the fan case, and wherein the attachment mechanism is configured to attach the component to the fan case boss via a bracket.

16. The fan section according to claim 15, including a thermal isolation barrier that surrounds the elongated body and the first and second washers such that the bracket directly contacts the thermal isolation barrier on one side of the attachment mechanism and the fan case boss directly contacts the thermal isolation barrier on an opposite side of the attachment mechanism.

17. The fan section according to claim 16, wherein the first and second washers each include a center opening, and including a first fastener extending through the center opening of the first washer and a second fastener extending through the center opening of the second washer, wherein the first and second fasteners fix the component to the fan case boss.

18. The fan section according to claim 13, wherein the fan case is comprised of a composite material, and wherein the elongated body is comprised of a rigid metallic material.

19. A gas turbine engine comprising:
a fan section that drives air along a bypass flow path via a bypass duct defined within a fan case;
a compressor section that drives air along a core flow path for compression and communication into a combustor section and subsequent expansion through a turbine section; and
a component attached to the fan case via an attachment mechanism that comprises an elongated body comprising a rigid, straight and flat bar that extends between first and second ends and two straight parallel sides connecting the first and second ends, and including a first washer formed at the first end and a second washer formed at the second end, wherein the elongated body is solid between the first and second washers and the two straight parallel sides, and wherein the first and second washers are integrally formed with the elongated body as a single-piece structure.

20. The gas turbine engine according to claim 19, wherein the fan case includes a fan case boss and wherein the attachment mechanism is configured to attach the component to the fan case boss via a bracket, and including
a thermal isolation barrier that surrounds the elongated body and the first and second washers such that the bracket directly contacts the thermal isolation barrier on one side of the attachment mechanism and the fan case boss directly contacts the thermal isolation barrier on an opposite side of the attachment mechanism,
a first fastener extending through a center opening of the first washer, and
a second fastener extending through a center opening of the second washer, wherein the first and second fasteners fix the component to the fan case boss.

\* \* \* \* \*